UNITED STATES PATENT OFFICE.

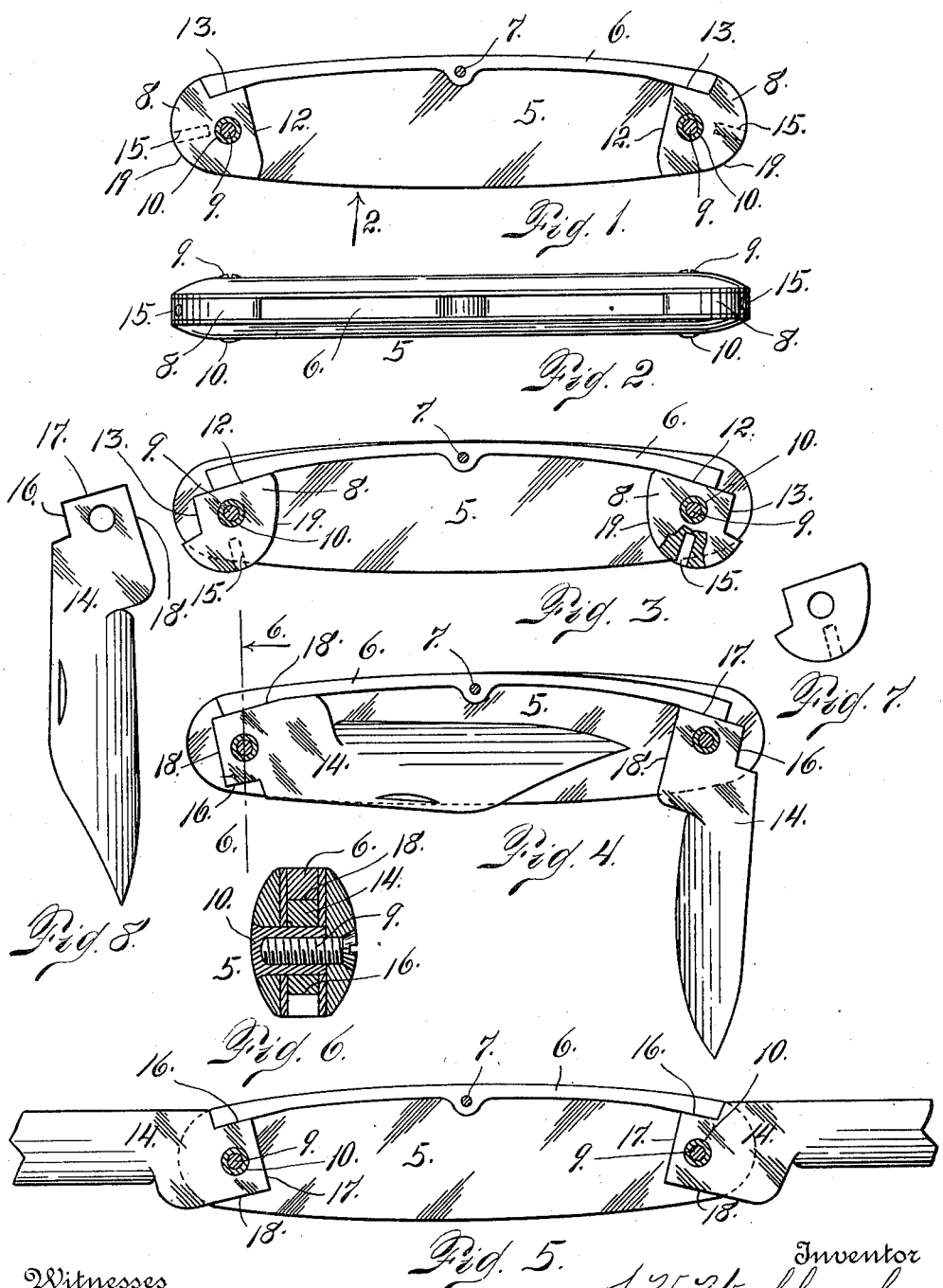

JOSEPH V. WECKBAUGH, OF DENVER, COLORADO.

POCKET-KNIFE.

1,029,564.

Specification of Letters Patent.  Patented June 11, 1912.

Application filed December 27, 1910. Serial No. 599,436.

*To all whom it may concern:*

Be it known that I, JOSEPH V. WECK-BAUGH, a citizen of the United States, residing in the city and county of Denver and State of Colorado, have invented certain new and useful Improvements in Pocket-Knives; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in pocket knives.

Heretofore so far as I am aware, the handles and blades roughly made have been assembled, after which the knife is finished by workmen who by hand manipulation in connection with grinding, smoothing and polishing devices finally produce the finished article.

The object of my present invention is to make it practicable to manufacture the handles and blades separately, and my improvement permits of forming the handles in the rough and applying false tangs to the handles and then finishing the handles with the tangs in place, the said false tangs taking the place of the blades for the aforesaid purpose.

My improvement is particularly adapted for use in connection with knives whose blades are readily attachable and detachable, and the blades and handles with the false tangs will be sold separately and thus kept in stock by the dealer. The purchaser of the knife will then decide on the style of blade or blades which he wishes for his knife. It will be understood that various sizes and styles of blades may be employed in connection with the same handle, the tangs of the blades, however, being all of the same pattern and the false tangs contained in the handle being substantial duplicates of the tangs forming parts of the blades which are intended for the corresponding handle.

Having briefly outlined the invention I will proceed to describe the same in detail, reference being made to the accompanying drawing, in which is illustrated an embodiment thereof.

In this drawing: Figure 1 is a view showing one side of the handle with the main spring and false tangs in place, the pins for retaining the spring and tangs in place being sectionized. Fig. 2 is an edge view of the complete knife, being a view looking in the direction of arrow 2. Fig. 3 is a view similar to Fig. 1, but showing the tangs in a different position. Fig. 4 is a similar view, but showing the blades in place instead of the false tangs. Fig. 5 is a view similar to Fig. 4, but showing the blades in different positions. Fig. 6 is a section taken on the line 6—6, Fig. 4. Fig. 7 is a detail view of one of the false tangs. Fig. 8 is a detail view of one of the blades.

The same reference characters indicate the same parts in all the views.

Let the numeral 5 designate the two sides of the handle of a knife manufactured in accordance with my improvement. The main spring 6 is interposed between the two handle members in the usual manner, being held in place by a centrally located pin 7. The two tangs are each designated 8, being respectively located in the opposite extremities of the handle and held in place by removable pivots composed of male and female members 9 and 10, the member 9 consisting of a screw and the member 10 having an interiorly threaded recess adapted to receive the said screw. By unscrewing the member 9 or detaching it from the member 10, the pivot pin may be removed, leaving the tang loose. The tangs in the construction illustrated in the drawing are so formed that the faces 12 that are adjacent the extremities of the spring or in contact therewith when the tangs are in the positions corresponding with the half-open position of the blades, are nearer the center of the pivot pin than the face 13, this difference being such that there is no tension on them when in this position, thus making it easy to remove the tangs and substitute blades and also remove one set of blades and substitute another set, since when the blades 14 are in corresponding positions they are also relieved from the tension of the spring, the tangs of the blades being duplicates of the false tangs in this respect.

From the foregoing description my improvement will be readily understood. The handle members 5 together with the spring and false tangs 8 are manufactured in the rough and assembled as illustrated in Figs.

1, 2 and 3. They are then finished by hand manipulation in connection with various machines for grinding, polishing and smoothing the various parts of the device when in the assembled relation. After this operation is completed, the handles are ready to receive blades having tangs of substantially the same pattern as the false tangs originally contained in the handle. The false tangs are provided with recesses 15 into which a pin or other suitable device may be inserted for the purpose of manipulating the tangs in the same manner as blades are manipulated.
Attention is called to the fact that the tangs of the blades employed as illustrated in the drawing, have three faces 16, 17 and 18, the face 17 being nearer the center of the pivot pin than either of the faces 16 or 18, the distance of the face 17 from the center of the said pivot being such as to relieve the blade from the tension of the spring 6 when the blade is in the half-open position. In the case of the false tangs, they are equipped with two faces 12 and 13 which respectively correspond with the faces 17 and 16 of the blades, which may be placed in the handle in the place of the false tangs. The false tangs have no face corresponding with the face 18 of the blade, but they have a curved face 19, the curve of which corresponds with the adjacent extremity of the handle 6, making it practicable to finish the handle when the space between its two parts is filled, thus facilitating the operation as compared with finishing the knife with the blade in place, in which event, assuming that the blade is closed, there is always a space beyond the blade at the handle extremity.
With reference to the false tangs, there is no necessity for having more than the two faces 12 and 13, the face 13 engaging the spring when the tang is under tension, and the face 12 being in engagement or adjacent to the spring when the tang is relieved. In the case of the blade the face 18 is necessary, since it engages the spring when the blade is closed. When the tang is in the position shown in Fig. 1, it corresponds with the position of the blade when the latter is wide open, but if the blade were in place and wide open, it would of course be impracticable to finish the handle extremity with the same facility that is permitted with the tang in place. Hence by virtue of my improvement the finishing of the handle is facilitated, in addition to making it practicable to finish the handles and blades separately.
In this specification the term false tang must be considered to include a duplicate, pattern or other dummy device composed of any suitable material and adapted to occupy the position within the handle extremity of the knife which the tang or pivoted end of the blade occupies after the blade is inserted.

Having thus described my invention, what I claim is:

1. A handle for pocket knives equipped with a main spring and a removable false tang fitted into the end of the handle and pivoted to take the place of a blade tang, which may be substituted for the false tang, the latter being shaped to exactly fill the tang end of the handle when in a position corresponding with the open position of the blade, the said false tang having three faces, the first and second of which are shaped to respectively engage the spring when in positions corresponding with the open and intermediate positions of a blade, the second face of the false tang being nearer the pivot than the first face, whereby the false tang is relieved from tension when the second face is adjacent to the spring, the tang, however, at such time being prevented from assuming either of the positions corresponding with the open or closed positions of a real blade without placing the spring under tension, the third face being flush with the exterior surface of the end of the handle when the tang is in position corresponding to the open position of the blade.

2. A knife blade provided with a main spring and a removable false tang pivoted to take the place of a blade tang and provided with three faces, the first of which is engaged by the said spring to place the tang under tension when the tang is in the position corresponding with the open position of a blade, the third face at the same time being flush with the outer surface of the end of the handle, the second face being nearer the pivot than the first face whereby the tang is relieved from tension when in a position corresponding to the position of a blade when intermediate the open and closed positions, the second face, however, when in the last-named position being shaped to conform approximately to the adjacent surface of the spring whereby the turning of the tang upon its pivot in either direction places the spring under tension.

In testimony whereof I affix my signature in presence of two witnesses.

JOSEPH V. WECKBAUGH.

Witnesses:
F. E. BOWEN,
A. EBERT O'BRIEN.